United States Patent

Sugiyama

[11] Patent Number: 6,015,020
[45] Date of Patent: *Jan. 18, 2000

[54] GEAR SHIFT CONTROL DEVICE OF AUTOMATIC TRANSMISSION FOR VARIABLE STAGE UPSHIFT AGAINST WHEEL SLIP

[75] Inventor: Mizuho Sugiyama, Toyota, Japan

[73] Assignee: Toyota Jidosha Kabushiki Kaisha, Toyota, Japan

[*] Notice: This patent is subject to a terminal disclaimer.

[21] Appl. No.: 08/825,623

[22] Filed: Mar. 31, 1997

[30] Foreign Application Priority Data

May 10, 1996 [JP] Japan ................ 8-141089

[51] Int. Cl.$^7$ .................................... G06G 7/70
[52] U.S. Cl. .................. 180/197; 701/55; 701/56; 701/90
[58] Field of Search .................. 180/197; 701/90, 701/55, 56

[56] References Cited

U.S. PATENT DOCUMENTS

| | | |
|---|---|---|
| 4,901,811 | 2/1990 | Uno et al. . |
| 5,029,493 | 7/1991 | Takeda et al. . |
| 5,504,680 | 4/1996 | Yamashita et al. ................ 364/426.03 |
| 5,676,433 | 10/1997 | Inagaki et al. . |
| 5,679,092 | 10/1997 | Otsubo et al. . |
| 5,704,695 | 1/1998 | Monzaki et al. . |
| 5,717,591 | 2/1998 | Okada et al. . |
| 5,741,051 | 4/1998 | Nakashima et al. .............. 303/141 |
| 5,839,083 | 11/1998 | Sugiyama ......................... 701/62 |

FOREIGN PATENT DOCUMENTS

| | | |
|---|---|---|
| A 180033 | 5/1986 | European Pat. Off. . |
| A 62-71729 | 4/1987 | Japan . |
| U 63-50727 | 4/1988 | Japan . |
| A 2-80858 | 3/1990 | Japan . |
| A 6-34038 | 2/1994 | Japan . |
| A-7-71589 | 3/1995 | Japan . |
| A 2-204368 | 11/1988 | United Kingdom . |

Primary Examiner—Lanna Mai
Assistant Examiner—Michael Cuff
Attorney, Agent, or Firm—Oliff & Berridge, PLC

[57] ABSTRACT

A gear shift control device of an automatic transmission of a vehicle, including a slip angle estimator for estimating a slip angle of at least one of a pair of drive wheels; a slip ratio estimator that estimates the slip ratio of the one drive wheel; a determiner that determines an upshift of the automatic transmission when the absolute value of the estimated slip ratio is greater than a threshold value; and a upshift executor for executing the upshift automatic transmission according to the upshift determined by the determiner, wherein the determiner determines the upshift to be of a greater number of stage within an available range against the absolute value of the estimated slip ratio according as the absolute value of the estimated slip angle is greater.

3 Claims, 4 Drawing Sheets

GEAR SHIFT CONTROL DEVICE OF AUTOMATIC TRANSMISSION FOR VARIABLE STAGE UPSHIFT AGAINST WHEEL SLIP

BACKGROUND OF THE INVENTION

1. Field of the Invention

The present invention relates to a gear shift control of an automatic transmission of a vehicle, and more particularly, to an improvement of a gear shift control of an automatic transmission for decreasing tire slip of vehicle wheels.

2. Description of the Prior Art

The automatic transmission of vehicles is generally controlled by a gear shift control device so as to be shifted among a plurality of shift stages according to a comparison of engine throttle opening versus vehicle speed such that, when the vehicle is started from standstill and gradually accelerated, the automatic transmission is successively shifted up to a higher shift stage according to a relative increase of the vehicle speed against the throttle opening, or when the vehicle is decelerated from a high speed running state, the automatic transmission is successively shifted down to a lower shift stage according to a relative reduction of the vehicle speed against the throttle opening. In addition to such a regular shift stage change control, it is known to control the shift stage change of the automatic transmission such that the stage is shifted up when the slip ratio of the drive wheel in the direction of decelerating the vehicle becomes excessive, for the purpose of improving the running stability of the vehicle, as described in Japanese Patent Laid-open Publication 6-34038, because the force which would slide the drive wheel along the road surface is the vector addition of a lateral force acting at the drive wheel due to a centrifugal force generated in the turning vehicle and a longitudinal force acting at the drive wheel corresponding to the longitudinal slip which can be decreased by an upshift of the transmission when the slip ratio is oriented in the direction of decelerating the vehicle. The improvement of the turn running stability by such an upshift of the automatic transmission against an excessive increase of the longitudinal slip of the drive wheel will be more effectively obtained when the transmission is shifted up for more stages, if available. However, when the transmission is shifted up by a greater number of shift stages, the drive torque of the drive wheel is reduced by a correspondingly greater ratio, substantially affecting the power performance of the vehicle.

SUMMARY OF THE INVENTION

In view of the above-mentioned contradictory conditions for an upshift of the automatic transmission for an improvement of the turn running stability of a vehicle and for the securement of the power performance of the vehicle, it is a principal object of the present invention to more critically optimize the number of stage of shifting up the automatic transmission of a vehicle against an excessive increase of the slip ratio of its drive wheel.

In order to accomplish such an object, the present invention proposes a gear shift control device of an automatic transmission of a vehicle having a pair of drive wheels and a pair of driven wheels, comprising:

a means for estimating slip angle of at least one of the pair of drive wheels;

a means for estimating slip ratio of said at least one drive wheel;

a means for determining an upshift of the automatic transmission when the absolute value of said estimated slip ratio is greater than a threshold value; and a means for executing upshift of the automatic transmission according to said upshift determined by said upshift determination means;

wherein said upshift determination means determines said upshift to be of a greater number of stage within an available range against the absolute value of said estimated slip ratio according as the absolute value of said estimated slip angle is greater.

By the number of stage of the upshift of the automatic transmission against an excessive increase of the slip ratio of the drive wheel of a vehicle being determined to be of a greater number of stage within an available range against the absolute value of the estimated slip ratio of the drive wheel according as the absolute value of the estimated slip angle is greater, the number of stage of shifting up the automatic transmission can be generally critically limited to be minimum not to interfere with the optimization of the power performance of the vehicle by the primary gear shifting of the automatic transmission, while effectively utilizing a timely upshift of the transmission for increasing the side grip capacity of the drive wheel against the side force acting thereto when the vehicle is making a turn, so as thereby to improve the turn stability of the vehicle, because, as will be understood hereinbelow, the need for decreasing the slip ratio of the drive wheel for the purpose of running stability is generally greater as the absolute value of the slip angle of the drive wheel is greater.

To be more precise and critical to the above-mentioned concept of the present invention, said upshift determination means may desirably comprise a means for estimating tire grip of said at least one drive wheel based upon said estimated slip angle and said estimated slip ratio and determine said upshift such that said estimated tire grip is approached to be within a grip range predetermined therefor by a minimum number of shift stage change.

In further detail, said upshift determination means may predetermine said grip range as an area defined inside of an ellipse on a coordinate system of abscissa and ordinate providing a coordination of slip angle and slip ratio of said at least one drive wheel, said ellipse having a first radius along one of the abscissa and ordinate and a second radius along the other of the abscissa and ordinate, said first radius being such a value of slip angle considered to be a maximum allowable for said at least one drive wheel when the slip ratio thereof is zero, said second radius being such a value of slip ratio considered to be a maximum allowable for said at least one drive wheel when the slip angle thereof is zero.

BRIEF DESCRIPTION OF THE DRAWINGS

In the accompanying drawings.

DESCRIPTION OF THE PREFERRED EMBODIMENT

In the following, the present invention will be described in more detail with respect to an embodiment with reference to the accompanying drawings.

Figure 1:
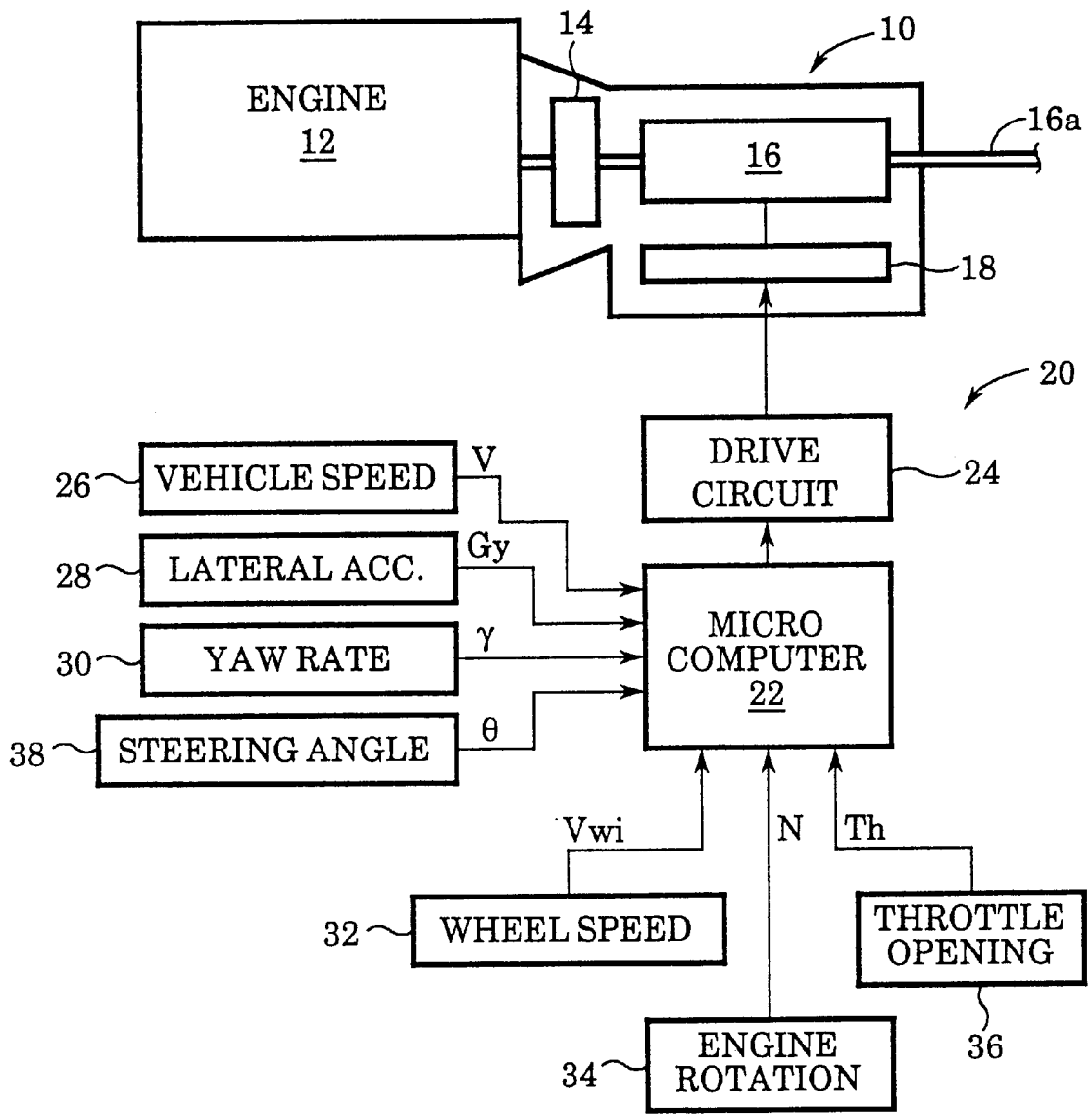
FIG. 1 is a diagrammatical illustration of an embodiment of the gear shift control device according to the present invention, shown as assembled to an automatic transmission of a vehicle (not shown) and supplied with data of various parameters available in a modern vehicle equipped with a running stability control system.

Referring to FIG. 1, an automatic transmission generally designated by 10 is assembled to an engine 12 of a vehicle such as an automobile not shown in the figure, the vehicle having a pair of drive wheels, a pair of driven wheels and a vehicle body suspended thereby, as quite well known in the art. The automatic transmission 10 includes a torque converter 14 of a conventional type, a changeover gear mechanism 16 having an output shaft 16a connected with the pair of drive wheels via a differential gear of a conventional construction not shown in the figure, and a hydraulic circuit means 18 for changing over the gear mechanism 16. The hydraulic circuit means 18 includes a plurality of solenoid valves adapted to be controlled by electric signals. Such an overall construction of the automatic transmission 10 is well known in the art in various types, as shown, for example, in U.S. Pat. No. 5,029,493 assigned to the same assignee as the present application.

The gear shift control device according to the present invention is indicated by 20 and includes a microcomputer 22 and a drive circuit 24. The microcomputer 22 may be of an ordinary construction including central processing unit, read only memory, random access memory, input and output port means, and common bus interconnecting those elements. The drive circuit 24 is adapted to generate electric currents for operating the solenoid valves of the hydraulic circuit means 18 based upon electronic control signals generated by the microcomputer 22.

The microcomputer 22 is supplied with signals representing vehicle speed V from a vehicle speed sensor 26, lateral acceleration Gy acting at the vehicle body from a lateral acceleration sensor 28, yaw rate γ of the vehicle body from a yaw rate sensor 30, vehicle speed Vwi (i=fl, fr, rl, rr) of front left, front right, rear left and rear right wheels from wheel speed sensors 32, engine rotation speed N from an engine rotation sensor 34, throttle opening Th from a throttle opening sensor 36, and steering angle θ of a steering wheel not shown in the figure from a steering angle sensor 38.

The construction of the gear shift control device 20 of the present invention will be described in the form of its control operation, because the construction of the device is essentially a software construction incorporated in the microcomputer 22.

Figure 2:
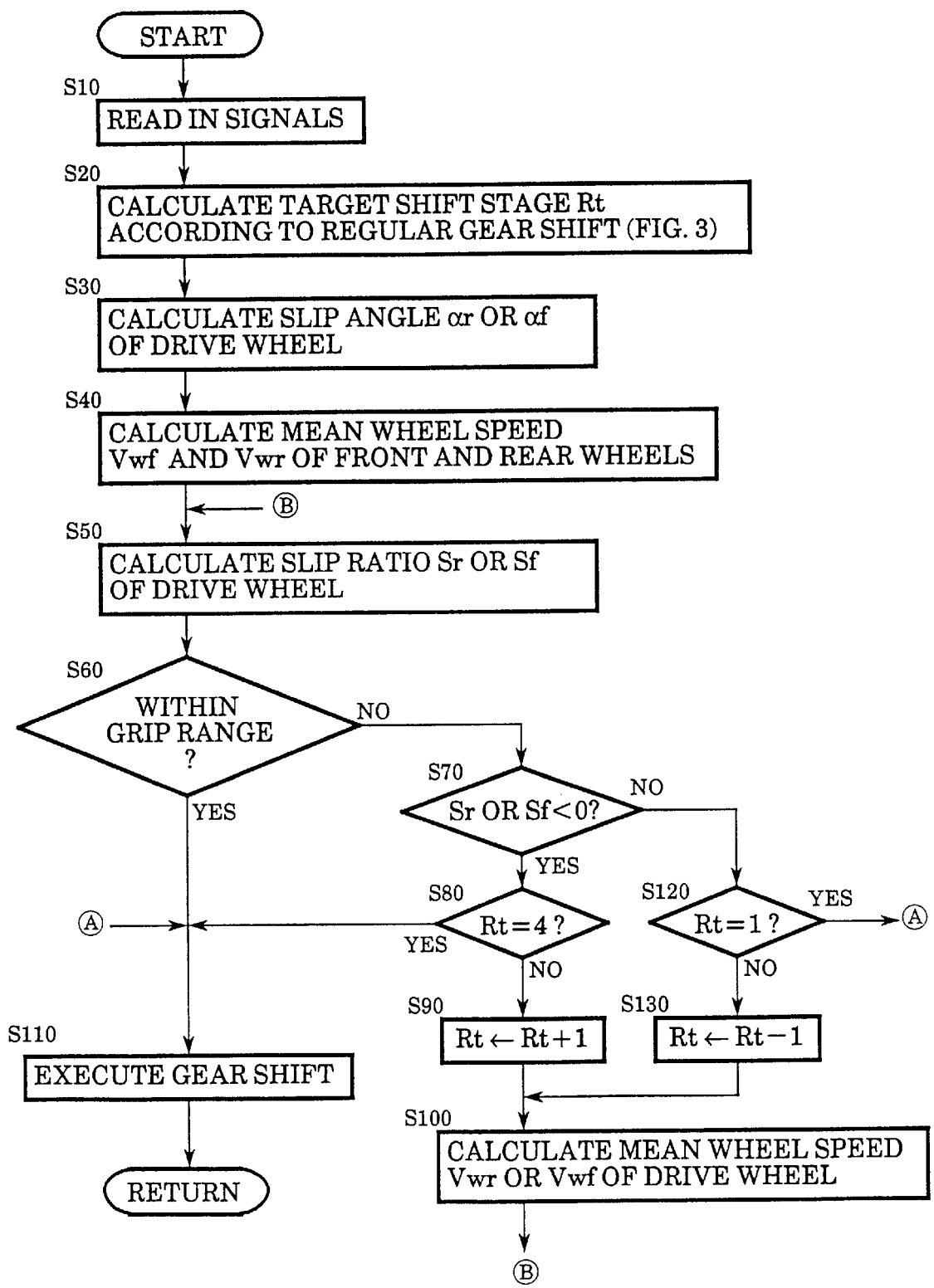
FIG. 2 is a flowchart showing an embodiment of the operation of the gear shift control device according to the present invention.

FIG. 2 shows an embodiment of the operation of the gear shift control device 20 in the form of a flowchart. The operation according to this flowchart is started with a closure of an ignition switch of the vehicle not shown in the figure, and is cyclically repeated at a cycle such as tens of microseconds until the ignition switch is opened.

When the control operation is started, in step 10, signals such as V, etc. are read in.

Figure 3:
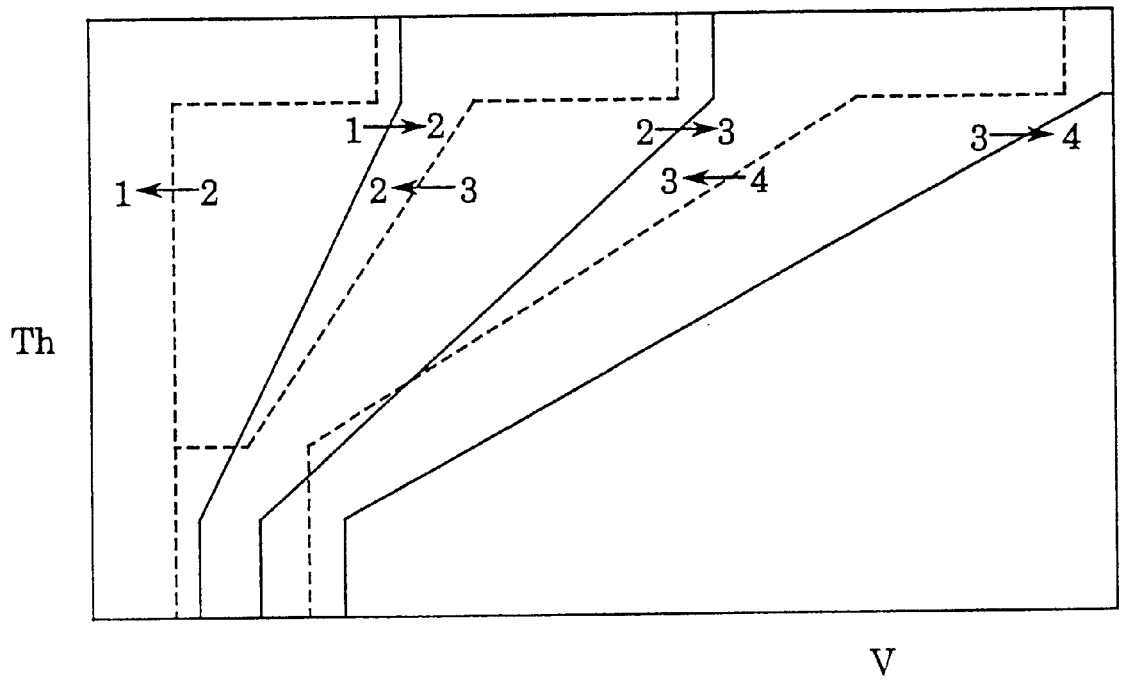
FIG. 3 is a diagram showing a general example of gear shifting schedule of the automatic transmission of a vehicle.

In step 20, based upon the read in values of vehicle speed V and throttle opening Th, by referring to a regular gear shift schedule such as shown as a map in FIG. 3, the microcomputer 22 calculates a target shift stage Rt which is to be set up for each instant current contrast of V vs. Th. The gear shift schedule shown in FIG. 3 is an example of those well known in the art. As well known in the art, when the target shift stage Rt, i.e. target point of V vs. Th, is on the right side of the current point of V vs. Th across any of 1→2, 2→3 and 3→4 upshift lines, the transmission is to be shifted up across the corresponding upshift line according to the conventional regular gear shifting, while if the target shift stage Rt is on the left side of the current shift stage across any of 1←2, 2←3 and 3←4 downshift lines, the transmission is to be shifted down across the corresponding downshift line according to the conventional regular gear shifting.

In step 30, the microcomputer 22 calculates slip angle αr of drive wheel with respect to at least one of the pair of rear wheels when the vehicle is a rear drive vehicle, or slip angle αf of drive wheel with respect to at least one of the pair of front wheels when the vehicle is a front drive vehicle, as follows:

First, difference between the lateral acceleration Gy of the vehicle body detected by the lateral acceleration sensor 28 and a product of the vehicle speed V detected by the vehicle speed sensor 26 and the yaw rate γ of the vehicle body detected by the yaw rate sensor 30 is calculated such as Gy–V×γ, then the difference is integrated on time basis to produce side slide velocity Vy of the vehicle, and then the side slide velocity Vy is divided by longitudinal velocity Vx of the vehicle (may be substituted for by the vehicle speed V detected by the vehicle speed sensor 26) to produce slip angle β of the vehicle body (more precisely, the slip angle of the vehicle body at its center of gravity).

Then, in the case of a rear drive vehicle, denoting longitudinal distance between a rear axle and the center of gravity of the vehicle body as Lr, slip angle of the rear wheels is calculated as follows:

$$\alpha r = -\beta + Lr \times \gamma / V$$

Since in a usual rear drive vehicle the pair of rear drive wheels are not steered, αr calculated as above may be applied to both of the pair of rear wheels, one serving at the inside of a turn and the other serving at the outside of the turn, with no particular compensation for the difference in the radius of curvature between the opposite sides wheels.

In the case of a front drive vehicle, denoting longitudinal distance between a front axle and the center of gravity of the vehicle body as Lf and steering angle of the front wheel with respect to at least one of the pair of front drive wheels as δ, the slip angle αf of the one front drive wheel is calculated as follows:

$$\alpha f = \delta - \beta - Lf \times \gamma / V$$

In a usual front drive vehicle, the front wheels are also steering vehicle wheels. The steering angle of the front wheel serving at the inside of a turn is generally made greater than that of the front wheel serving at the outside of the turn to compensate for the difference in the radius of curvature traced by the front wheel serving at the inside and that serving at the outside of the turn. Therefore, the angle δ in the above equation converted from the turning angle θ of the steering wheel detected by the sensor 38 is different according to whether the slip angle αf is calculated with respect to the front wheel serving at the inside of a turn or the front wheel serving at the outside of the turn. In this connection, considering that the vertical load on the wheels is shifted from the wheel serving at the inside of a turn to the wheel serving at the outside of the turn under the influence of the centrifugal force, and that the tire grip against the load surface is generally proportional to the vertical load on the wheel, thereby rendering the wheel serving at the inside of the turn to be more liable to saturation of the tire grip than the wheel serving at the outside of the turn, for a more stable operation of the vehicle, it will be desirable that the slip angle δ is made the steering angle of the front wheel serving at the inside of the turn, so that the critical control by the gear shift control device according to the present invention is applied to the front wheel serving at the inside of the turn. Therefore, in the context of the present specification, the above-mentioned at least one drive wheel is to be primarily understood, not for limiting, to indicate the drive wheel serving at the inside of the turn, particularly when the drive wheels are the front wheels.

In step 40, mean wheel speed of the front and rear wheels are calculated as follows:

$$Vwf=(Vwfl+Vwfr)/2$$

$$Vwr=(Vwrl+Vwrr)/2$$

In step 50, the slip ratio of the drive wheel is calculated as follows:

$$Sr=(Vwr-Vwf)/Vwf \text{ (for rear drive vehicle)}$$

$$Sf=(Vwf-Vwr)/Vwr \text{ (for front drive vehicle)}$$

In step 60, it is judged if the vector addition of the slip angle and the slip ratio of the drive wheel is within a predetermined grip range, as follows:

$$\frac{\alpha r^2}{\alpha m^2} + \frac{Sr^2}{Sm^2} = 1 \quad \text{(for rear drive vehicle)}$$

$$\frac{\alpha f^2}{\alpha m^2} + \frac{Sf^2}{Sm^2} = 1 \quad \text{(for front drive vehicle)}$$

Figure 4A:
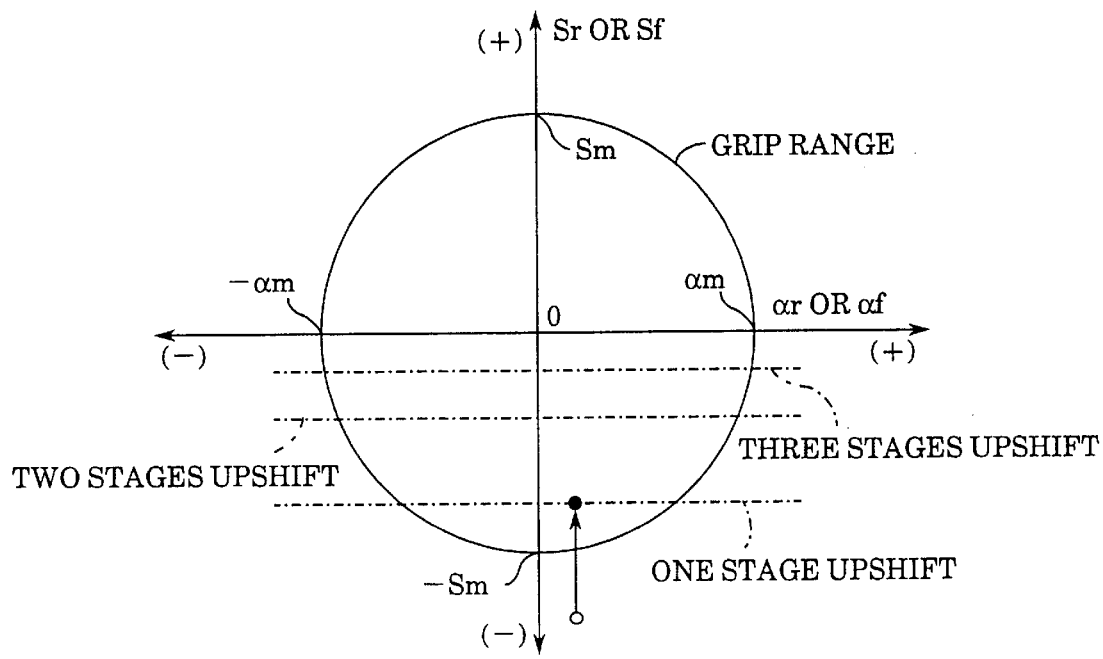
FIGS. 4A and 4B are diagrams showing examples of determining the upshift of the automatic transmission on a coordinate system of the slip angle and the slip ratio of the drive wheel.
Figure 4B:
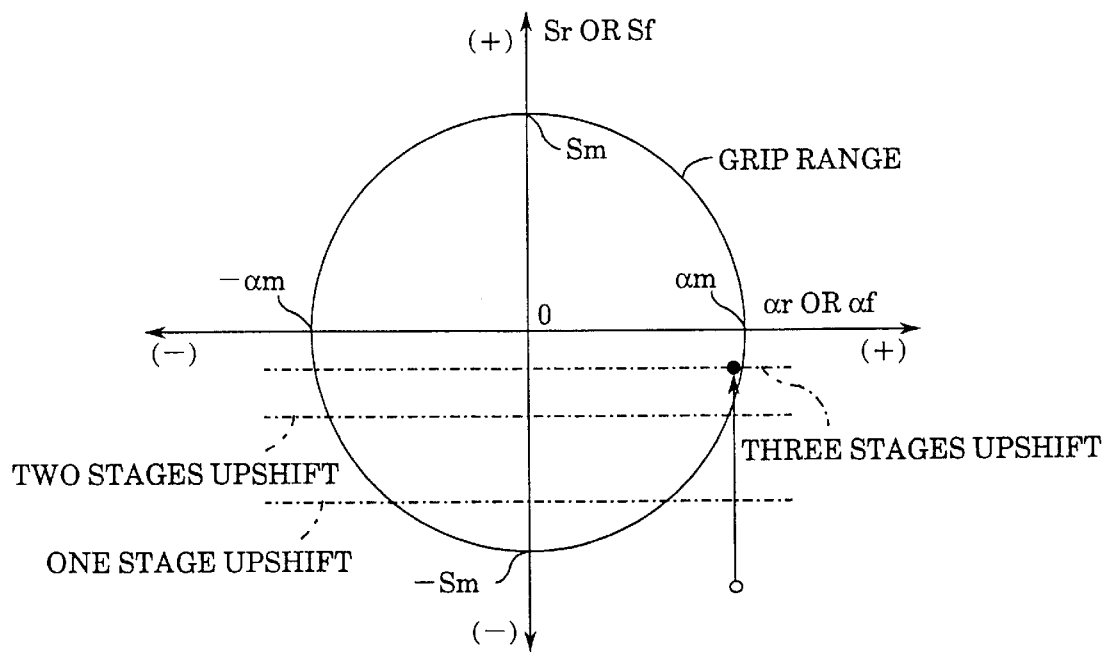

The relationship among αr and Sr or αf and Sf and αm and Sm are illustrated in FIGS. 4A and 4B. In these figures, an area defined by a circle therein shown defines the grip range according to the present invention, and is analogous to the "friction circle" known in the art as a circle representing an area in which the vector addition of lateral force and longitudinal force acting at a wheel is overcome or supported by the friction acting between the tire of the wheel and the road surface. In the case of the conventional friction circle, as the term indicates by itself, it is assumed that a wheel tire is frictionally held by a same value of force in all directions along the road surface, so that, when an area is defined on a coordinate system of abscissa representing the lateral force acting at the wheel and ordinate representing the longitudinal force acting at the wheel, the area in which the force due to the addition of the lateral force and the longitudinal force is overcome by the friction between the wheel tire and the road surface shows a circle having a constant radius in all directions. In this case, therefore, the unit of the abscissa and that of the ordinate are same with one another, i.e. "force". In contrast, in the case of the grip range according to the present invention, the unit of one of the abscissa and the ordinate forming a coordinate system thereof (in fact, the abscissa in the embodiment shown in FIGS. 4A and 4B) is the slip angle of the drive wheel, while the unit of the other of the abscissa and the ordinate (in fact, the ordinate in the embodiment shown in FIGS. 4A and 4B) is the slip ratio of the drive wheel.

Since the slip angle αr or αf of the drive wheel is generally proportional to the lateral force acting at the drive wheel until the tire grip thereof substantially saturates, while the slip ratio Sr or Sf is also generally proportional to the longitudinal force acting at the drive wheel until the tire grip thereof substantially saturates, if the slip angle αr or αf is converted into a corresponding lateral force with an appropriate first factor, while the slip ratio Sr or Sf is converted into a corresponding longitudinal force with an appropriate second factor, the grip range of the present invention could be replaced by the conventional friction circle. However, the difference of the present invention from the conventional art is the direct evaluation of the slip angle and the slip ratio of the drive wheel, so that the allowable maximum values αm and Sm with respect to the slip angle and the slip ratio may be each optionally determined to define an optimum grip range for even better harmony of the power performance and the running stability performance of a vehicle. Of course, the values of αm and Sm may be variably controlled according to various operating conditions of the vehicle such as road surface, tire performance, vehicle loading, etc.

The grip range according to the present invention directly defined by a coordinate system consisting of slip angle αr or αf and slip ratio Sr or Sf is fundamentally an elliptical area (though conveniently shown as a circle in FIGS. 4A and 4B) based upon the condition that the point on one of the abscissa and the ordinate (abscissa in the shown embodiment) indicated by αm shows a value of the slip angle considered to be a maximum allowable for the drive wheel when the slip ratio is zero, while the point on the other of the abscissa and the ordinate (ordinate in the shown embodiment) indicated by Sm shows a value of the slip ratio considered to be a maximum allowable for the drive wheel when the slip angle is zero.

If the answer of step 60 is no, the control proceeds to step 70, and it is judged if the slip ratio Sr or Sf is negative. According to the general rule in this art, the sign of the slip ratio is determined to be positive when the wheel is driving the vehicle with a slipping against the road surface, and to be negative when the wheel is braking the vehicle with a slipping against the road surface. In this connection, further, according to a general rule in this art, parameters having lateral orientation such as lateral acceleration Gy, yaw rate γ and steering angle θ are made positive when the vehicle is making a left turn and is made negative when the vehicle is making a right turn. When the answer of step 70 is yes, the control proceeds to step 80, and it is judged if the target shift stage Rt is 4th shift stage, assuming that the 4th shift stage is the highest shift stage of the changeover gear mechanism 16. Then, if the answer is no, the control proceeds to step 90, and the target shift stage is incremented by one stage, and then the control proceeds to step 100.

In step 100, wheel speed which the drive wheel would show when the transmission was shifted to the target shift stage Rt incremented in step 90 under the current rotation speed of the engine is calculated based upon reduction gear ratio Kt of the gear mechanism 16 corresponding to the incremented target shift stage Rt, factor Kc representing reduction gear ratio of the differential gear and the engine rotation speed N, as follows:

$$Vwr \text{ or } Vwf=Kt \times Kc \times N$$

Then, the control returns to step 50, and the slip ratio of the drive wheel is recalculated based on the assumption that the transmission was shifted up by one shift stage from the current shift stage. Then, again, in step 60, it is judged if such an assumed slip ratio, as combined with the current slip angle, will be in the grip range. If the answer is still no, the control proceeds again to step 70, and it is judged if Sr or Sf is still negative (generally no change in this respect) and then, in step 80, it is judged if Rt incremented in the previous cycle in step 90 is still less than the highest shift stage. If the answer of step 90 is still no, the control proceeds again to step 90, and the target shift stage is further incremented by one stage, and then the control proceeds again to step 100 to calculate the wheel speed Vwr or Vwf based upon the further incremented shift stage, and then the control returns again to step 50.

When the answer of step 60 is yes, i.e. when the slip angle/slip ratio of the drive wheel is in the grip range with or without upshift through steps 70-80-90-100, or when the answer of step 80 is yes, i.e. there is no room for upshift of the transmission, the control proceeds to step 110, and the gear shift control device executes gear shift according to the final target shift stage, changing shift stage if the target shift stage was changed in the meantime, or maintaining the same shift stage when there was no change of the target shift stage.

In the embodiment shown in FIG. 2, when the answer of step 70 was no, i.e. when the drive wheel is making a positive slip against the road surface by a strong acceleration drive from the engine, the control proceeds to step 120, and it is judged if the target shift stage Rt is first (lowest) stage. If the answer is no, i.e., if there is a room for a downshifting of the gear mechanism, the control proceeds to step 130, and the transmission is shifted down by one stage, so that the positive slip ratio is decreased or canceled by deceleration of the wheel speed. This part of the flowchart is not directly concerned with the aforementioned object of the present invention.

FIG. 4A shows an example that the control proceeds once from step 60 to step 70, then through steps 80, 90 and 100, then returns to step 50, then proceeds to step 60, where the answer now turns to yes, and then the control proceeds to 110, thus the transmission being shifted up by only one stage, so that the drive wheel operating at the white point located outside of the grip range is brought to the black point located at the inside of the grip range. As will be understood in FIG. 4A, when the start point is relatively close to the ordinate, i.e., when the vehicle is running with the slip angle being relatively small, the drive wheel showing a relatively large slip ratio exceeding a certain threshold value and located outside of the grip range as viewed on the coordination system of slip ratio and slip angle, is relatively easily brought into the grip range as by one stage upshift.

In contrast, however, when the drive wheel is operating with a relatively large slip angle as exemplarily shown in FIG. 4B, even though the value of the slip ratio is comparable with that of the example of FIG. 4A, it will need an upshift of three stages for the drive wheel being brought into the grip range. If the black point after the three stages upshift is still outside of the grip range, it is unavoidable. The control is to approach the white point as close to be within the grip range as possible. In this case, as viewed in the control process of the flowchart of FIG. 2, the control passes three times through the route of steps 60-70-80-90-100 before the control proceeds to step 110. Further, as will noted from FIGS. 4A and 4B, the number of stage or stages to be shifted up according to the present invention generally increases, within an available range, according to increase of the absolute value of the slip angle against the same absolute value of the slip ratio (slip ratio is negative as herein concerned).

Although the present invention was described with respect to a particular embodiment thereof, it will be apparent for those skilled in the art that various modifications are possible without departing from the spirit of the present invention.

I claim:

1. A gear shift control device of an automatic transmission of a vehicle having a pair of drive wheels and a pair of driven wheels, comprising:

a means for estimating slip angle of at least one of the pair of drive wheels;

a means for estimating slip ratio of said at least one drive wheel;

a means for determining an upshift of the automatic transmission when the absolute value of said estimated slip ratio is greater than a threshold value; and a means for executing upshift of the automatic transmission according to said upshift determined by said upshift determination means;

wherein said upshift determination means determines said upshift to be of a greater number of stage within an available range against the absolute value of said estimated slip ratio according as the absolute value of said estimated slip angle is greater.

2. A gear shift control device according to claim 1, wherein said upshift determination means comprises a means for estimating tire grip of said at least one drive wheel based upon said estimated slip angle and said estimated slip ratio, and determines said upshift such that said estimated tire grip is approached to be within a grip range predetermined therefor by a minimum number of shift stage change.

3. A gear shift control device according to claim 2, wherein said upshift determination means predetermines said grip range as an area defined inside of an ellipse on a coordinate system of abscissa and ordinate providing a coordination of slip angle and slip ratio of said at least one drive wheel, said ellipse having a first radius along one of the abscissa and the ordinate and a second radius along the other of the abscissa and the ordinate, said first radius being such a value of slip angle considered to be a maximum allowable for said at least one drive wheel when the slip ratio thereof is zero, said second radius being such a value of slip ratio considered to be a maximum allowable for said at least one drive wheel when the slip angle thereof is zero.

* * * * *